(12) United States Patent
Hyodo et al.

(10) Patent No.: US 8,567,186 B2
(45) Date of Patent: Oct. 29, 2013

(54) CONTROL APPARATUS FOR WORKING VEHICLE

(75) Inventors: Koji Hyodo, Kasumigaura (JP);
Nobuyuki Hidaka, Kasumigaura (JP);
Masaki Yoshikawa, Kasama (JP);
Tsuyoshi Takeyama, Ryugasaki (JP);
Kazuo Chonan, Moriya (JP); Yasuo Yamazaki, Ryugasaki (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 1050 days.

(21) Appl. No.: 12/530,986

(22) PCT Filed: Mar. 12, 2008

(86) PCT No.: PCT/JP2008/054520
§ 371 (c)(1),
(2), (4) Date: Sep. 11, 2009

(87) PCT Pub. No.: WO2008/111616
PCT Pub. Date: Sep. 18, 2008

(65) Prior Publication Data
US 2010/0024412 A1 Feb. 4, 2010

(30) Foreign Application Priority Data

Mar. 12, 2007 (JP) ................................. 2007-061955

(51) Int. Cl.
*F16D 31/02* (2006.01)
(52) U.S. Cl.
USPC ............................................. 60/431; 60/420

(58) Field of Classification Search
USPC .......................... 60/426, 431, 420, 422, 445
See application file for complete search history.

(56) References Cited

U.S. PATENT DOCUMENTS 3,246,465 A * 4/1966 Bookout et al. ................ 60/433
4,697,418 A * 10/1987 Okabe et al. ................... 60/434
(Continued)

FOREIGN PATENT DOCUMENTS

EP 0 344 311 A1 12/1989
EP 0 467 440 A1 1/1992
(Continued)

OTHER PUBLICATIONS

Extended European Search Report dated Apr. 2, 2012 (six (6) pages).
International Search Report dated May 1, 2008 (two (2) pages).

*Primary Examiner* — Edward Look
*Assistant Examiner* — Michael Quandt
(74) *Attorney, Agent, or Firm* — Crowell & Moring LLP (57) ABSTRACT

A control apparatus for a working vehicle includes a travel circuit HC1 formed through a closed circuit connection of a variable displacement hydraulic pump driven by an engine and a variable displacement hydraulic motor, a work circuit HC2 that includes a work hydraulic pump driven by the engine and a work hydraulic actuator that operates by pressure oil from the work hydraulic pump, a relief valve that relieves high pressure oil of the travel circuit HC1, a rotation speed control unit that controls the engine rotation speed in correspondence to an accelerator pedal operation amount, a state detection unit that detects a vehicle state of high load travel and high load work, and a speed limitation unit that reduces an engine rotation speed upper limit when the vehicle state of high load travel and high load work is detected.

7 Claims, 11 Drawing Sheets

(56) References Cited

U.S. PATENT DOCUMENTS

| | | | |
|---|---|---|---|
| 5,197,860 A * | 3/1993 | Nishida et al. | 417/34 |
| 5,203,168 A * | 4/1993 | Oshina et al. | 60/426 |
| 5,638,677 A * | 6/1997 | Hosono et al. | 60/431 |
| 5,720,358 A * | 2/1998 | Christensen et al. | 180/53.4 |
| 5,911,506 A * | 6/1999 | Nakamura et al. | 37/348 |
| 7,849,952 B2 * | 12/2010 | MacGregor et al. | 180/306 |
| 2002/0073699 A1 | 6/2002 | Nishimura et al. | |
| 2006/0276948 A1 | 12/2006 | Toda | |

FOREIGN PATENT DOCUMENTS

| | | |
|---|---|---|
| EP | 0 761 491 A2 | 3/1997 |
| JP | 63-186978 A | 8/1988 |
| JP | 2-13143 U | 1/1990 |
| JP | 2-266161 A | 10/1990 |
| JP | 2818474 B2 | 8/1998 |
| JP | 2004-52610 A | 2/2004 |
| JP | 2005-90354 A | 4/2005 |
| WO | WO 2005/024208 A1 | 3/2005 |
| WO | WO2006054711 * | 5/2006 |

* cited by examiner

CONTROL APPARATUS FOR WORKING VEHICLE

TECHNICAL FIELD

The present invention relates to a control apparatus for working vehicle such as a wheel loader.

BACKGROUND ART

There are apparatuses known in the related art, for a working vehicle having an HST (hydrostatic transmission) travel circuit and a working circuit such as a wheel loader, that limit the maximum displacement of a traveling hydraulic motor in correspondence to the discharge pressure of a working hydraulic pump so as to reduce travel driving force (refer to, for example, Patent Reference Literature #1). In the apparatus disclosed in Patent Reference Literature #1, an HST pump and a working hydraulic pump are each driven by an engine, and the pump discharge amount changes according to the engine rotation speed. Travel drive pressure of the HST circuit is limited by a relief valve.

Patent Reference Literature 1: Japanese Patent Publication No. 2818474

DISCLOSURE OF THE INVENTION

Problems to be Solved by the Invention

In excavation work, the operator fully operates the accelerator pedal so as to hold the engine rotation speed at its maximum in an attempt to take a large amount of soil in the bucket. However, since this state gives a large amount of the pump discharge, the relief amount of pressure oil flowing through the relief valve increases, thereby resulting in great heat energy loss.

Means for Solving the Problems

A control apparatus for working vehicle according to the present invention comprises: a travel circuit that is formed through a closed circuit connection of a variable displacement hydraulic pump driven by an engine and a variable displacement hydraulic motor; a work circuit that comprises a work hydraulic pump that is driven by the engine and a work hydraulic actuator that operates by pressure oil from the work hydraulic pump; a relief device that relieves high pressure oil of at least one of the travel circuit and the work circuit; an operating member that instructs an engine rotation speed; a rotation speed control unit that controls the engine rotation speed in correspondence to an operation amount of the operating member; a state detection unit that detects a vehicle state of high load travel and high load work; and a speed limitation unit that reduces an upper limit of engine rotation speed that is controlled by the rotation speed control unit when at least the vehicle state of high load travel and high load work is detected by the state detection unit.

A travel circuit pressure detector that detects a load pressure in the travel circuit; and a work circuit pressure detector that detects a load pressure in the work circuit may be provided, and the vehicle state of high load travel and high load work may be determined when at least a travel circuit pressure detected by the travel circuit pressure detector is equal to or greater than a set travel circuit pressure and a work circuit pressure detected by the work circuit pressure detector is equal to or greater than a set work circuit pressure.

A vehicle speed detector that detects a vehicle speed; an operation amount detector that detects an operation amount of the operating member; and a work circuit pressure detector that detects a load pressure in the working circuit may be provided, and the vehicle state of high load travel and high load work may be determined when at least a vehicle speed detected by the vehicle speed detector is equal to or less than a set vehicle speed, an operation amount detected by the operation amount detector is equal to or greater than a predetermined value, and a work circuit pressure detected by the work circuit pressure detector is equal to or greater than a set work circuit pressure.

A travel decision unit that makes a decision as to whether or not a vehicle is in a travelable state may be further included, and the vehicle state of high load travel and high load work may also be determined when the travel decision unit determines that the vehicle is in a travelable state, a vehicle speed detected by the vehicle speed detector is equal to or less than a set vehicle speed, an operation amount detected by the operation amount detector is equal to or greater than a predetermined value, and a work circuit pressure detected by the work circuit pressure detector is equal to or greater than a set work circuit pressure.

In this case, it is preferable that the set vehicle speed is set to a greater value as the engine rotation speed is higher.

The upper limit of the engine rotation speed may be reduced when the vehicle state of high load travel and high load work continues to be detected by the state detection unit for a predetermined length of time.

The relief device may be configured to be a relief valve that relieves high pressure oil in the travel motion circuit; and when the vehicle state of high load travel and high load work is detected by the state detection unit, the upper limit of the engine rotation speed may be reduced to a first rotation speed at which a relationship that a maximum travel load pressure in the travel circuit corresponds to a relief pressure that is defined by the relief valve is established.

It is preferable that the maximum travel load pressure in the travel circuit becomes the relief pressure when the engine rotation speed is equal to or greater than a second rotation speed; and that the first rotation speed is set to a higher value than the second rotation speed.

Advantageous Effect of the Invention

According to the present invention, since the upper limit of the engine rotation speed is reduced when a vehicle state with high load travel and high load operation is detected, the relief amount in the circuit is reduced, thereby reducing heat energy loss.

BRIEF DESCRIPTION OF THE DRAWINGS

FIG. 6 (*a*) A figure showing the relationship between the engine rotation speed and the maximum value of travel load pressure. (*b*) A figure showing the relationship between the engine rotation speed and the maximum value of travel driving force.

BEST MODE FOR CARRYING OUT THE INVENTION

The First Embodiment

The following is an explanation of the first embodiment of a control apparatus for working vehicle according to the present invention, given in reference to FIGS. 1 to 8.

Figure 1:
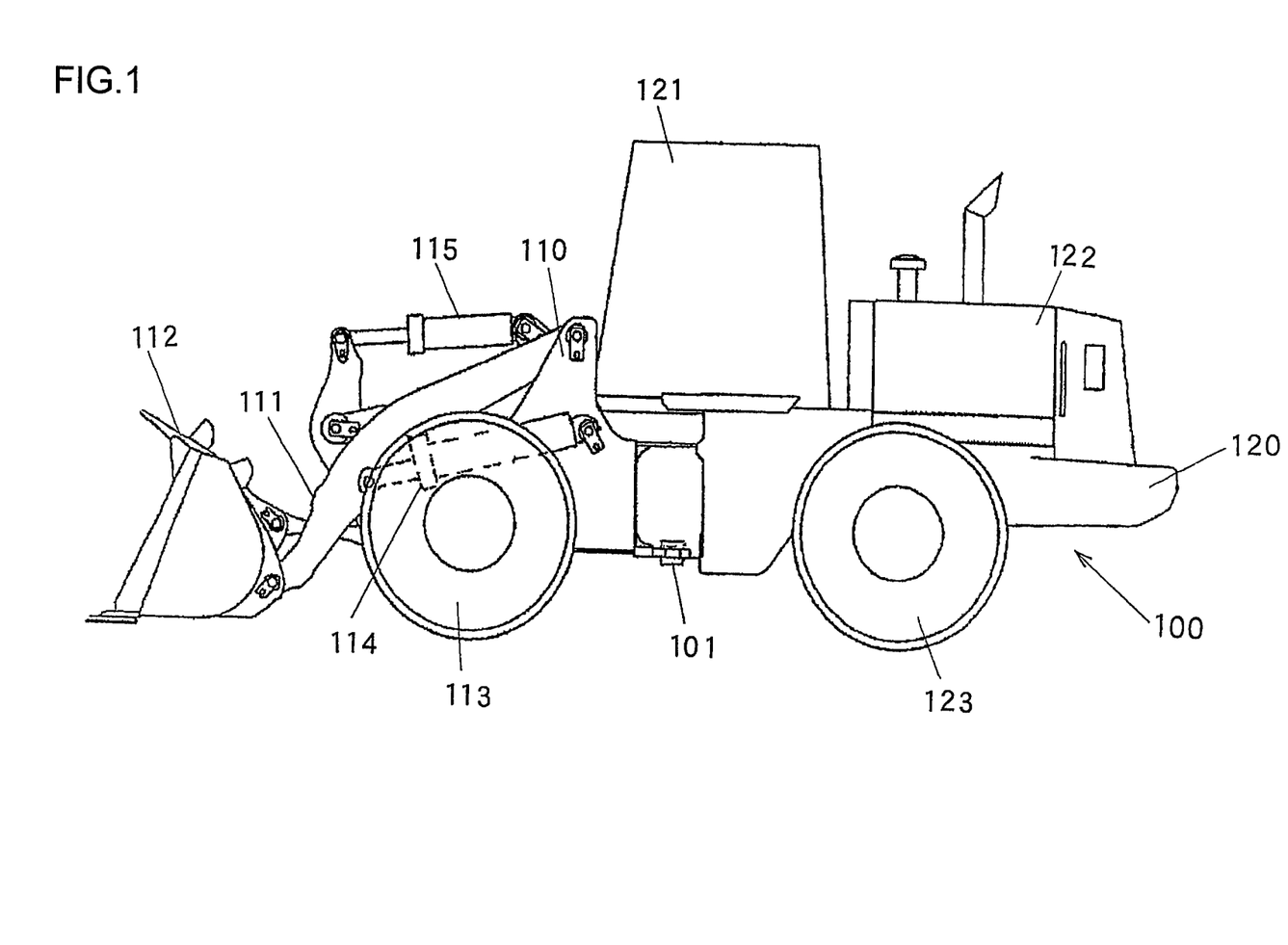
FIG. 1 A side view of a wheel loader that is an example of a working vehicle to which a control apparatus according to an embodiment of the present invention is applied.

FIG. 1 is a side view of a wheel loader that is an example of a working vehicle to which a travel control apparatus according to the present embodiment is applied. A wheel loader 100 is constituted by a front body 110 that includes an arm 111, a bucket 112, tires 113, and so on and a rear body 120 that includes a driver's cab 121, an engine room 122, tires 123, and so on. The arm 111 vertically rotates (moves up and down) by drive of an arm cylinder 114, whereas the bucket 112 vertically rotates (dumps or crowds) by drive of a bucket cylinder 115. The front body 110 and the rear body 120 are rotatably connected to each other by a center pin 101. Expansion and contraction of a steering cylinder (not figured herein) causes the front body 110 to move right and left relative to the rear body 120.

Figure 2:
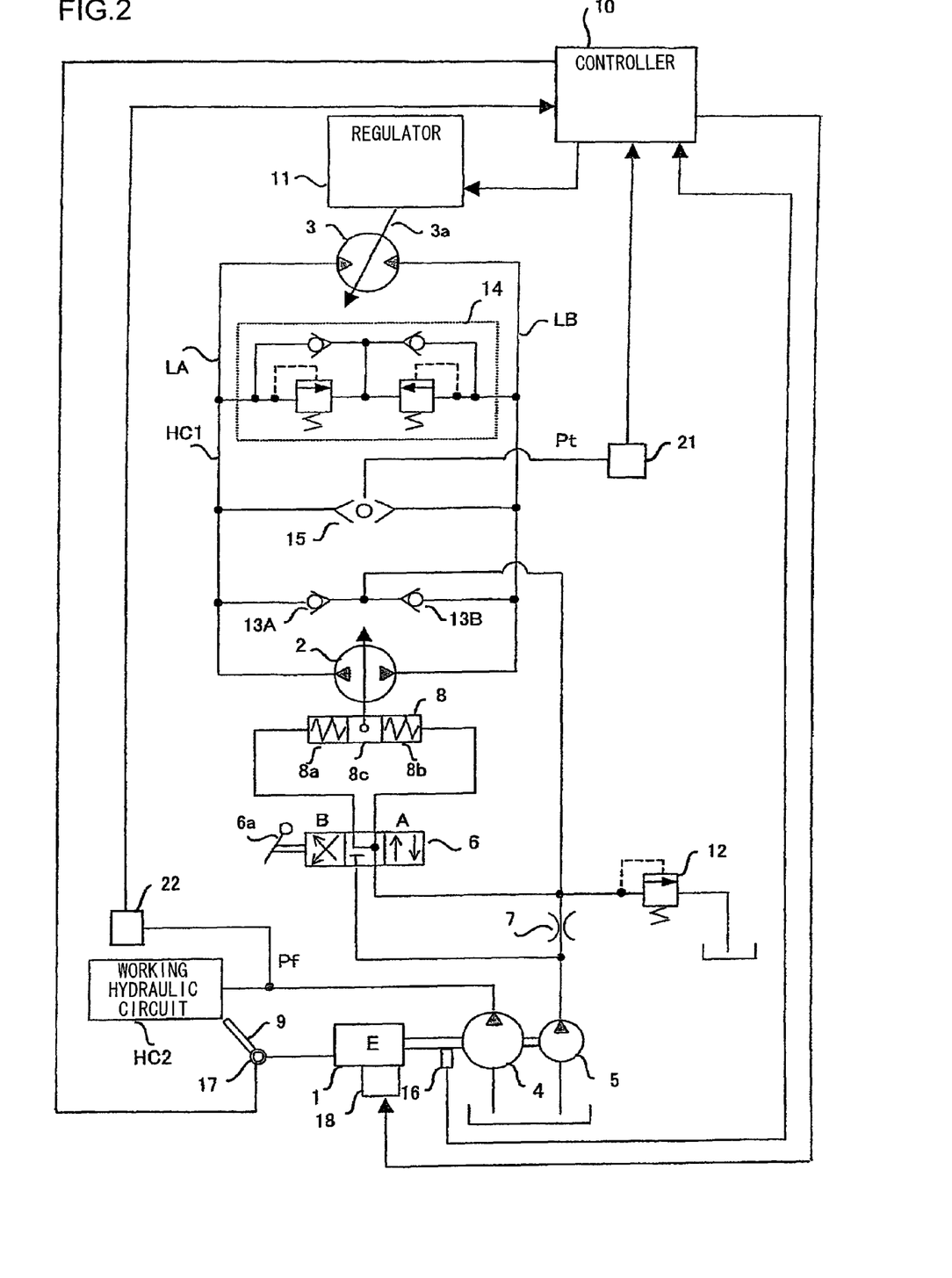
FIG. 2 A schematic structure of the control apparatus according to a first embodiment.

FIG. 2 is a schematic structure of the control apparatus according to the first embodiment. A traveling hydraulic circuit HC1, including a variable displacement hydraulic pump 2 that is driven by an engine 1 and a variable displacement hydraulic motor 3 that is driven by pressure oil from the hydraulic pump 2, is constituted by an HST circuit achieved through a closed circuit of the hydraulic pump 2 and the hydraulic motor 3 connected through a pair of main pipelines LA and LB. A working hydraulic circuit HC2 includes the arm cylinder 114 and the bucket cylinder 115 to which pressure oil is supplied from a working hydraulic pump 4 driven by the engine 1.

Pressure oil is guided from a charge pump 5 driven by the engine 1 to a displacement cylinder 8 through a forward/reverse switching valve 6. The forward/reverse switching valve 6 is operated by an operation lever 6*a*. As illustrated, when the forward/reverse switching valve 6 is in a neutral position, pressure oil is applied from the charge pump 5 to oil chambers 8*a* and 8*b* of the displacement cylinder 8 through a restrictor 7 and the forward/reverse switching valve 6. In this state, pressures applied to the oil chambers 8*a* and 8*b* are equal to each other, and a piston 8*c* is in a neutral position. Therefore, the displacement of the hydraulic pump 2 becomes equal to zero, and the pump discharge amount is zero.

When the forward/reverse switching valve 6 is switched to a A position, the upstream pressure and the downstream pressure of the restrictor 7 apply to the oil chambers 8*a* and 8*b*, respectively. Therefore, a pressure difference is generated in the oil chambers 8*a* and 8*b* of the cylinder 8, and the piston 8*c* is displaced rightward as indicated in FIG. 2. This causes the pump displacement of the hydraulic pump 2 to increase, pressure oil from the hydraulic pump 2 to be guided to the hydraulic motor 3 through the main pipeline LA, the hydraulic motor 3 to rotate forward, and the vehicle to travel forward. When the forward/reverse switching valve 6 is switched to a B position, the piston 8*c* of the displacement cylinder 8 is displaced leftward as indicated in FIG. 2. This causes pressure oil from the hydraulic pump 2 to be guided to the hydraulic motor 3 through the main pipeline LB, and the hydraulic motor 3 to rotate backward.

The engine rotation speed is adjusted by an accelerator pedal 9, and the discharge amount of the charge pump 5 is proportional to the engine rotation speed. Accordingly, the differential pressure between the upstream and the downstream of the restrictor 7 is proportional to the engine rotation speed and the hydraulic pump displacement is also proportional to the engine rotation speed. Pressure oil from the charge pump 5 flows through the restrictor 7 and check valves 13A and 13B and is guided to the main pipelines LA and LB. The downstream pressure of the restrictor 7 is limited by a charge relief valve 12, whereas the maximum pressure in the main pipelines LA and LB is limited by a relief valve 14. It is to be noted that the maximum pressure in the working hydraulic circuit HC2 is limited by a relief valve which is not figured herein that is provided in the working hydraulic circuit HC2.

A controller 10 includes a processing unit including a CPU, a ROM, a RAM, another peripheral circuit, and so on. Signals are input to the controller 10 each from a pressure sensor 21 that detects pressure (travel circuit pressure Pt) in the main pipelines LA and LB selected by a high-pressure selection valve 15, from a pressure sensor 22 that detects discharge pressure (working circuit pressure Pf) of a working pump 4, from a tachometer 16 that detects the engine rotation speed (the engine rotation rate), and from an operation amount detector 17 that detects the operation amount of the accelerator pedal 9.

Figure 3:
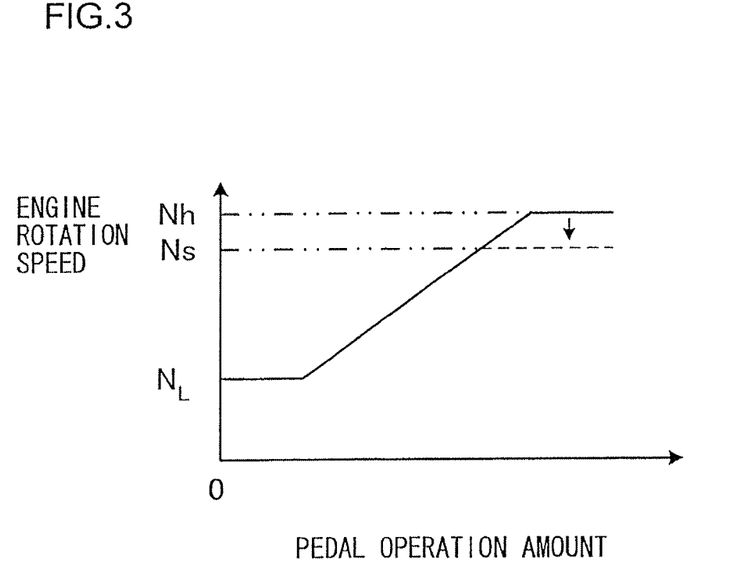
FIG. 3 A figure showing the relationship of the engine rotation speed to the operation amount of an accelerator pedal.

The relationship of the engine rotation speed to the operation amount of the accelerator pedal 9 as shown in FIG. 3 is stored in the controller 10 in advance. In FIG. 3, the engine rotation speed increases from NL to Nh with an increase in the pedal operation amount. Nh indicates the upper limit Nlim of the engine rotation speed. In the present embodiment, when a predetermined condition is met as described later, the upper limit Nlim of the engine rotation speed is decreased to a predetermined value Ns, and the engine rotation speed is controlled in correspondence to operation of the accelerator pedal 9 in accordance with the characteristic in FIG. 3 within a range not exceeding the upper limit Nlim.

The controller 10 includes a motor displacement control unit that controls the motor displacement and a speed upper limit setting unit that sets the upper limit Nlim of the engine rotation speed. The CPU executes following processing so as to output control signals to each of an electric regulator 11 and an engine control device 18.

Figure 4:
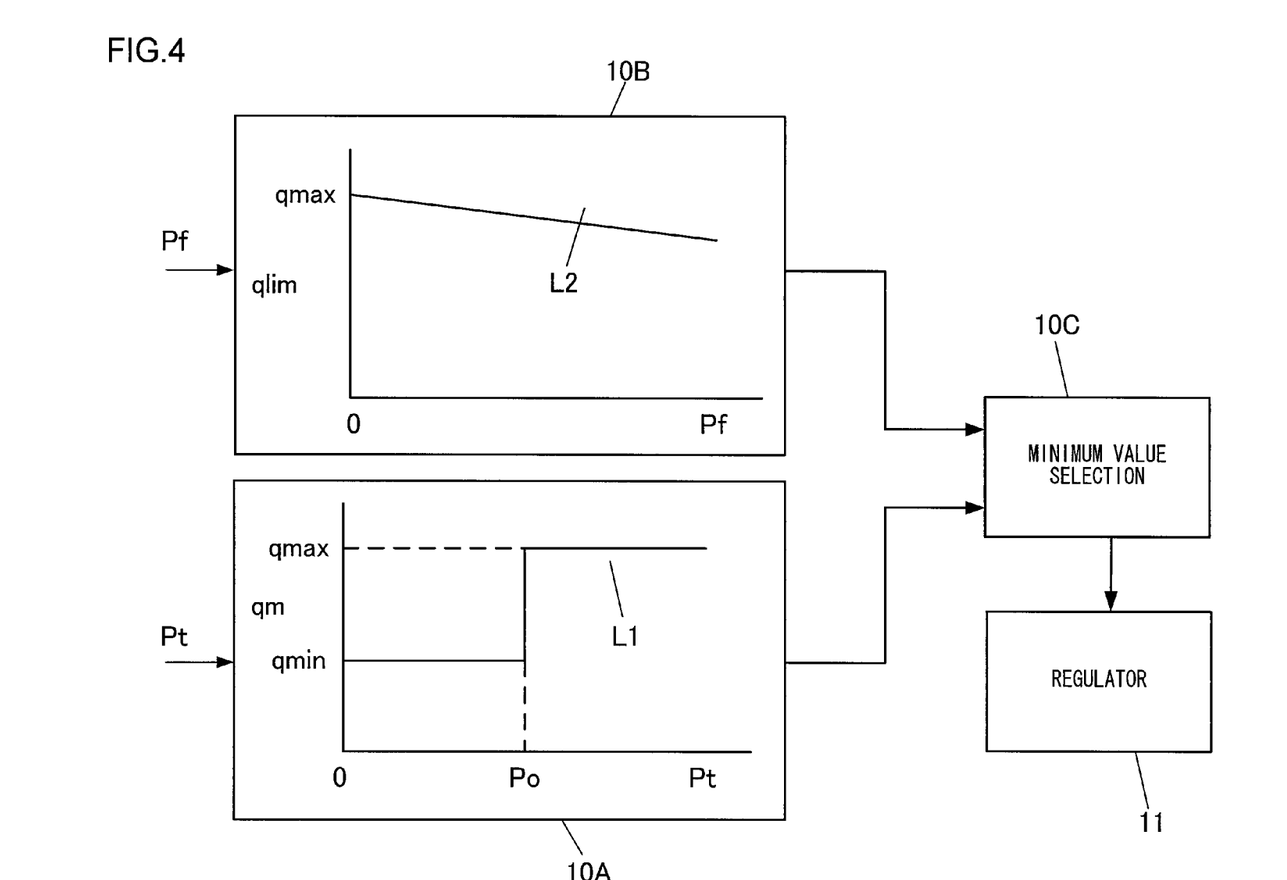
FIG. 4 A block diagram of an example of processing that may be executed by the motor displacement control unit according to the first embodiment.

FIG. 4 is a block diagram of an example of processing that may be executed by the motor displacement control unit. The travel circuit pressure Pt is input to a function generator 10A. A characteristic L1 is set in advance for the function generator 10A as shown, and according to the characteristic L1, a target displacement qm (target displacement volume) is calculated in correspondence to the travel circuit pressure Pt. According to the characteristic L1, the target displacement qm is a minimum displacement qmin when the travel circuit pressure Pt is less than a predetermined value P0, whereas the target displacement qm increases from the minimum qmin to the maximum qmax when the travel circuit pressure Pt is equal to the predetermined value P0, and the target displacement qm becomes equal to the maximum qmax in the range where the travel circuit pressure Pt is greater than the predetermined value P0. The product of the travel circuit pressure Pt (more accurately, the differential pressure between the main pipelines LA and LB) and the motor displacement qm corresponds to output torque of the hydraulic motor 3. The hydraulic motor 3 outputs drive torque in correspondence to the load so as to obtain the driving force for traveling of the vehicle.

The working circuit pressure Pf is input to a function generator 10B. A characteristic L2 is set in advance for the function generator 10B as shown. In accordance with the characteristic L2, an upper limit qlim of the motor displacement is calculated in correspondence to the working circuit pressure Pf. According to the characteristic L2, the upper limit qlim of the motor displacement is equal to the maximum displacement qmax of the characteristic L1 when the working circuit pressure Pf is zero, and qlim gradually decreases with an increase in the working circuit pressure Pf. When the working circuit pressure Pf is the pressure rating, i.e. a rated pressure, the upper limit qlim of the motor displacement falls in a range of approximately 50% to 70% of the maximum displacement qmax.

The target displacement qm calculated by the function generator 10A and the upper limit qlim of the motor displacement calculated by the function generator 10B are each input to a minimum value selection circuit 10C. The minimum value selection circuit 10C selects qm or qlim, whichever is smaller, as a target displacement, and the regulator 11 is controlled so that the motor displacement becomes the target displacement.

In this manner, when the working circuit pressure Pf is zero, i.e., when the vehicle is engaged in traveling only, the motor displacement is controlled between qmin and qmax along the characteristic L1. When the working circuit pressure Pf is generated, i.e., when work is performed while the vehicle is traveling, the motor displacement is controlled to be either the target displacement qm corresponding to the travel circuit pressure Pt of the characteristic L1 or the upper limit qlim corresponding to the working circuit pressure Pf of the characteristic L2, whichever is smaller, and the maximum value of the motor displacement is limited to the upper limit qlim.

Figure 5:
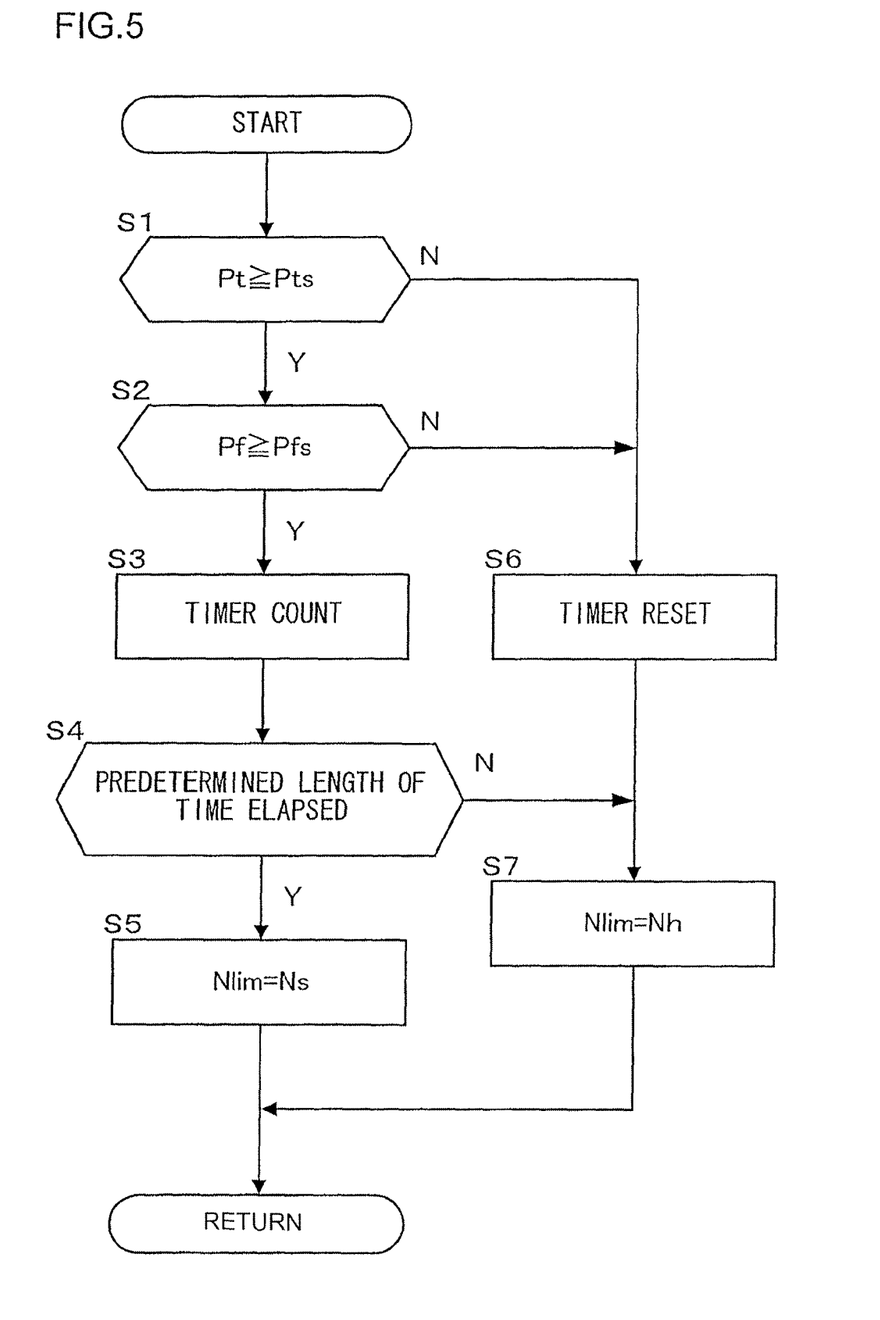
FIG. 5 A flowchart of an example of processing that may be executed by a speed upper limit setting unit according to the first embodiment.

FIG. 5 is a flowchart of an example of processing that may be executed by the speed upper limit setting unit in the controller 10. The processing in this flowchart starts, for example, as an engine key switch is turned on. In a step S1, a decision is made as to whether or not the travel circuit pressure Pt having been detected by the pressure sensor 21 is equal to or greater than a predetermined value Pts. The predetermined value Pts is a threshold value used for making a decision as to whether or not an excavation work is performed by operation of the arm 111. In excavation work, since travel load increases and the travel circuit pressure Pt increases to near the relief pressure, the predetermined value Pts is set to, for instance, approximately 70 to 90% of a relief pressure Ptr of the relief valve 14 (refer to FIG. 7). Upon making an affirmative decision in the step S1, the flow of processing proceeds to a step S2.

In the step S2, a decision is made as to whether or not the working circuit pressure Pf having been detected by the pressure sensor 22 is equal to or greater than a predetermined value Pfs. The predetermined value Pfs is a threshold value used for making a decision as to whether or not an excavation work is performed by operation of the arm 111. When the arm cylinder 114 is operated with the bucket 112 thrust into the soil, working load is greater than that in the case where the bucket cylinder 115 is operated. Considering this working load, the predetermined value Pfs is set to, for example, approximately 70 to 90% of the relief pressure Pfr of the relief valve provided in the working circuit HC2 (refer to FIG. 7). Upon making an affirmative decision in the step S2, the flow of processing proceeds to a step S3, in which a timer counts time. In a step S4, a decision is made as to whether or not the timer has counted a predetermined length of time t0, i.e., whether or not the state of Pt≧Pts and Pf≧Pfs continues for the predetermined length of time t0.

Upon making an affirmative decision in the step S4, the flow of processing proceeds to a step S5, whereas upon making a negative decision in the step S4, the flow of processing proceeds to a step S7. In the step S5, the upper limit Nlim of the engine rotation speed is set to the predetermined value Ns (FIG. 3). On the other hand, upon making a negative decision in the step S1 or the step S2, the flow of processing proceeds to a step S6 to reset the timer. In the step S7, the upper limit Nlim of the engine rotation speed is set to the predetermined value Nh.

Upon setting the upper limit Nlim of the engine rotation speed in the above manner, the controller 10 outputs a control signal to the engine control device 18 so as to control the engine rotation speed in correspondence to the operation amount of the accelerator pedal 9 without exceeding the upper limit Nlim. Accordingly, in the case where the accelerator pedal 9 is fully operated, the engine rotation speed is controlled to be Nh if the upper limit Nlim has been set to Nh, whereas the engine rotation speed is controlled to be Ns if the upper limit Nlim has been set to Ns.

Figure 6:
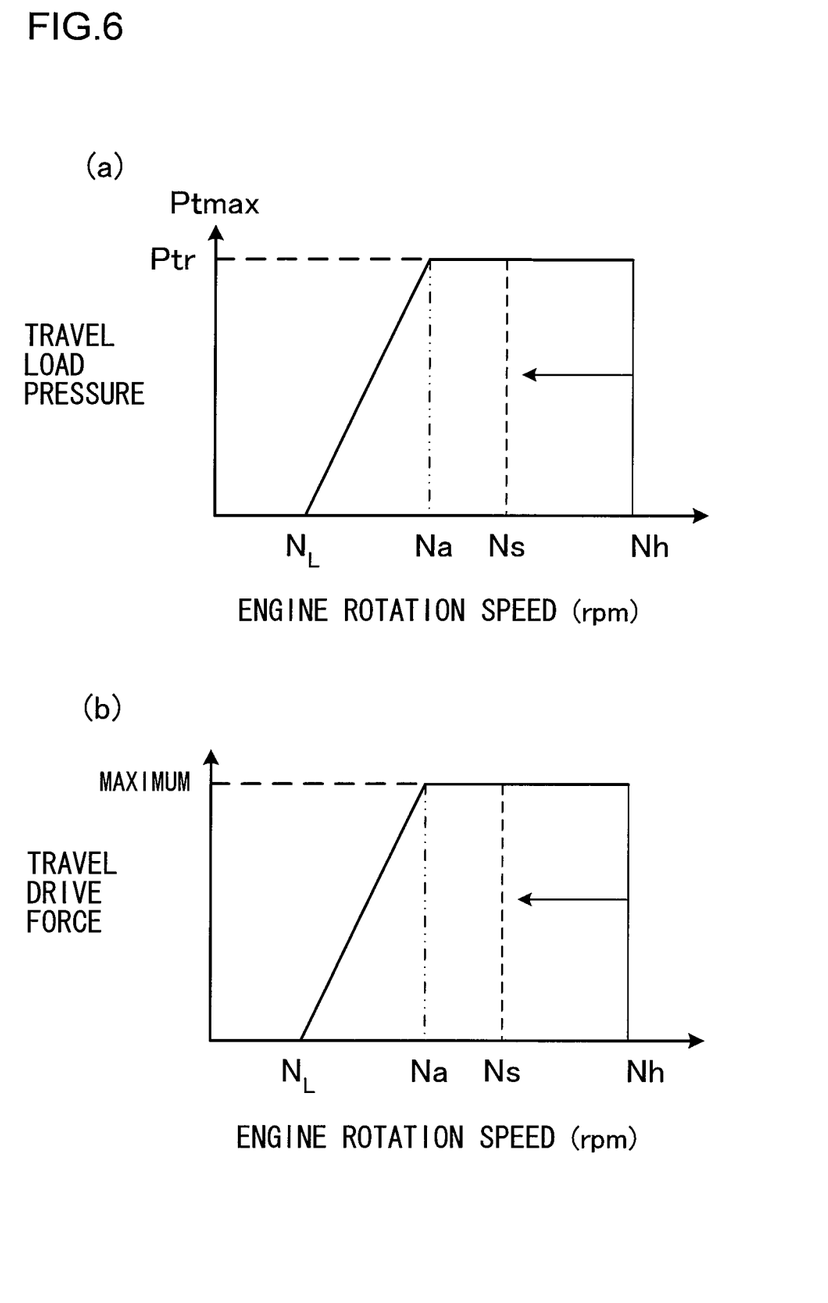
Figure 7:
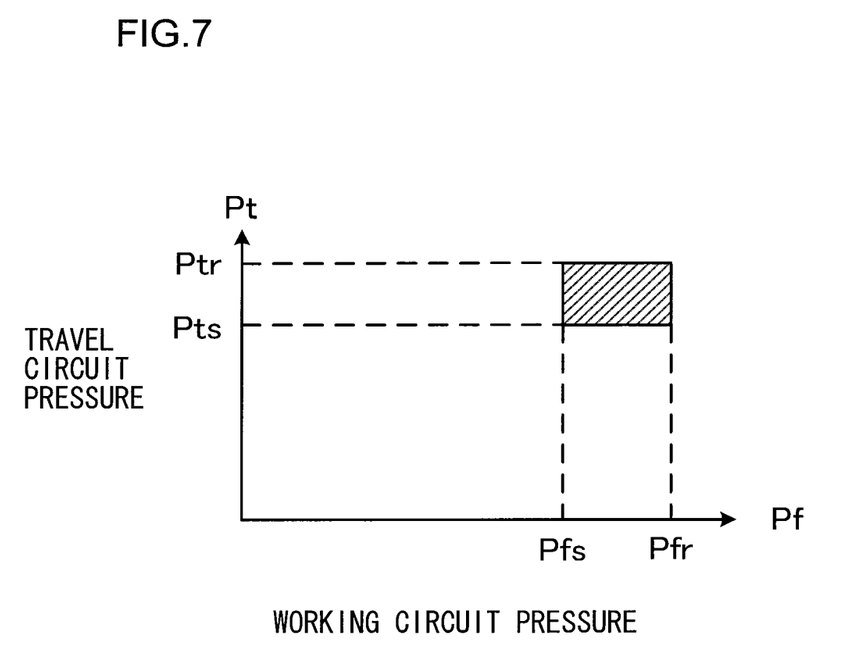
FIG. 7 A figure illustrating a control range of travel circuit pressure and working circuit pressure that reduce the upper limit of the engine rotation speed.

The predetermined value Ns is now explained in detail. FIGS. 6 (a) and (b) show the relationship between the engine rotation speed and the maximum value Ptmax (the maximum pressure) of the travel load pressure Pt that can be discharged from the hydraulic pump 2 at the corresponding rotation speed, and the relationship between the engine rotation speed and the travel driving force corresponding to the maximum pressure Ptmax, respectively. As FIG. 6 (a) shows, the maximum pressure Ptmax proportionally increases in the range where the engine rotation speed is from NL to Na and becomes equal to the relief pressure Ptr of the relief valve 14 in the range where the engine rotation speed is equal to or greater than Na. As FIG. 6 (b) shows, the maximum value of the travel driving force also proportionally increases in the range where the engine rotation speed is from NL to Na and becomes maximum in the range where the engine rotation speed is equal to or greater than Na.

Accordingly, in order to maximize the travel driving force, at least the engine rotation speed needs to be equal to or greater than Na. If the engine rotation speed is too fast (e.g., the engine speed of Nh), the relief amount from the relief valve 14 increases, thereby resulting in great heat energy loss. It is to be noted that similarly, in the case of the working hydraulic circuit HC2, if the engine rotation speed is too fast during high load operation, the relief amount from the relief valve increases, thereby resulting in great heat energy loss.

Therefore, in the present embodiment, the engine rotation speed is reduced to Ns so that the maximum driving force is exerted while reducing heat energy loss in an operation in which priority is given to working load over operating speed, namely, a high load operation for which the hydraulic circuits HC1 and HC2 do not require much pump flow rate (e.g., excavation work in which the arm 111 is operated while the bucket 112 is thrust into the soil). It is to be noted that the engine rotation speed varies because of the influence of hydraulic oil temperature or the like, therefore Ns is set to higher than Na by a predetermined value (e.g., 100 to 300 rpm) so that the maximum driving force is realized even if the engine rotation speed varies.

Operations of the control apparatus of working vehicle according to the first embodiment are now explained.

Figure 8:
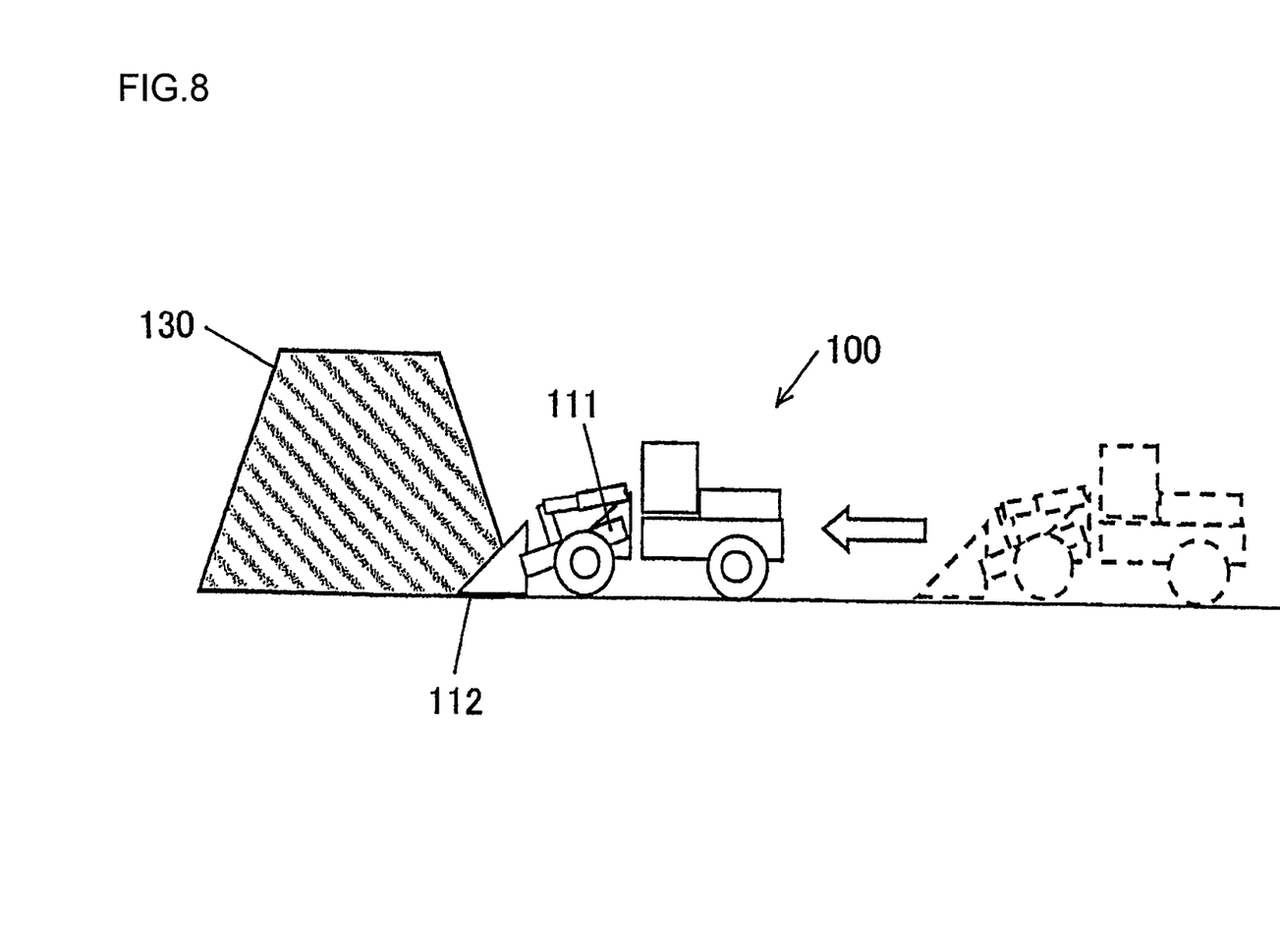
FIG. 8 An illustration of excavation work.

For instance, as FIG. 8 shows, in the event that the wheel loader 100 moves toward a mound 130 of the soil so as to perform an excavation work, the operator fully operates the accelerator pedal 9 so as to operate the arm 111 to lift the bucket 112 while thrusting the bucket 112 into the soil. At this time, since relatively high working load and travel load are applied simultaneously to the vehicle, the vehicle becomes in a high load state in which the working circuit pressure Pf is equal to or greater than the predetermined value Pfs and the travel circuit pressure Pt is equal to or greater than the predetermined value Pts as shown by hatching in FIG. 7. Even in the high load state, the upper limit Nlim of the engine rotation speed is equal to Nh (the step S7) before the predetermined length of time t0 elapses, and the engine rotation speed becomes equal to Nh when the pedal is fully depressed. Accordingly, even if the working circuit pressure Pf momentarily rises while the vehicle is traveling with the travel circuit pressure Pt high, the engine rotation speed does not fluctuate, thereby preventing poor fuel consumption and resulting in control stability.

When the high load state continues for the predetermined length of time t0, the upper limit Nlim of the engine rotation speed decreases to Ns (the step S5) so that the engine rotation speed becomes equal to Ns. Since this decreases the discharge amount of the hydraulic pump 2, the relief amount flowing through the relief valve 14 decreases, thereby reducing heat energy loss. This results in improved fuel consumption, reduced noise, and downsized hydraulic oil cooler volume. Even if the engine rotation speed is reduced to Ns at this time, the maximum driving force can be achieved (FIG. 6 (b)), so that high load excavation work can be performed without difficulty.

According to the first embodiment, the following operational effects can be achieved.

(1) When the state in which the travel circuit pressure Pt is equal to or greater than the predetermined value Pts and the working load pressure Pf is equal to or greater than the predetermined value Pfs continues for the predetermined length of time t0, the upper limit Nlim of the engine rotation speed decreases from Nh to Ns. This reduces the relief amount of the traveling hydraulic circuit HC1 and the working hydraulic circuit HC2, thereby resulting in reduced heat energy loss.

(2) The upper limit Nlim of the engine rotation speed is reduced on the condition that the travel circuit pressure Pt is equal to or greater than the predetermined value Pts and the working load pressure Pf is equal to or greater than the predetermined value Pfs. This causes the upper limit Nlim to remain equal to Nh in the event that the vehicle travels while the working circuit pressure Pf alone is high or in the event that the vehicle travels while the travel circuit pressure Pt alone is high, thereby achieving sufficient travel speed and working speed.

(3) Even if the travel circuit pressure Pt becomes equal to or greater than the predetermined value Pts and the working load pressure Pf becomes equal to or greater than the predetermined value Pfs, the upper limit Nlim of the engine rotation speed is maintained at Nh unless the state continues for the predetermined length of time t0. Thus, the engine rotation speed can be prevented from fluctuating in the event that the circuit pressures Pt and Pf momentarily change.

(4) Since the upper limit Nlim is set to the engine rotation speed Ns, which is higher by a predetermined value than the minimum engine rotation speed Na at which the maximum driving force can be exerted, the maximum driving force is assured even if the engine rotation speed varies because of the influence of hydraulic oil temperature or the like.

(5) When the travel circuit pressure Pt is equal to or greater than the predetermined value Pts and the working circuit pressure Pf is equal to or greater than the predetermined value Pfs, the upper limit Nlim of the engine rotation speed is reduced. Therefore, the engine rotation speed can be decreased before the circuit pressures Pt and Pf increase to the relief pressures Ptr and Pfr, respectively, thereby achieving efficiency.

The Second Embodiment

Figure 9:
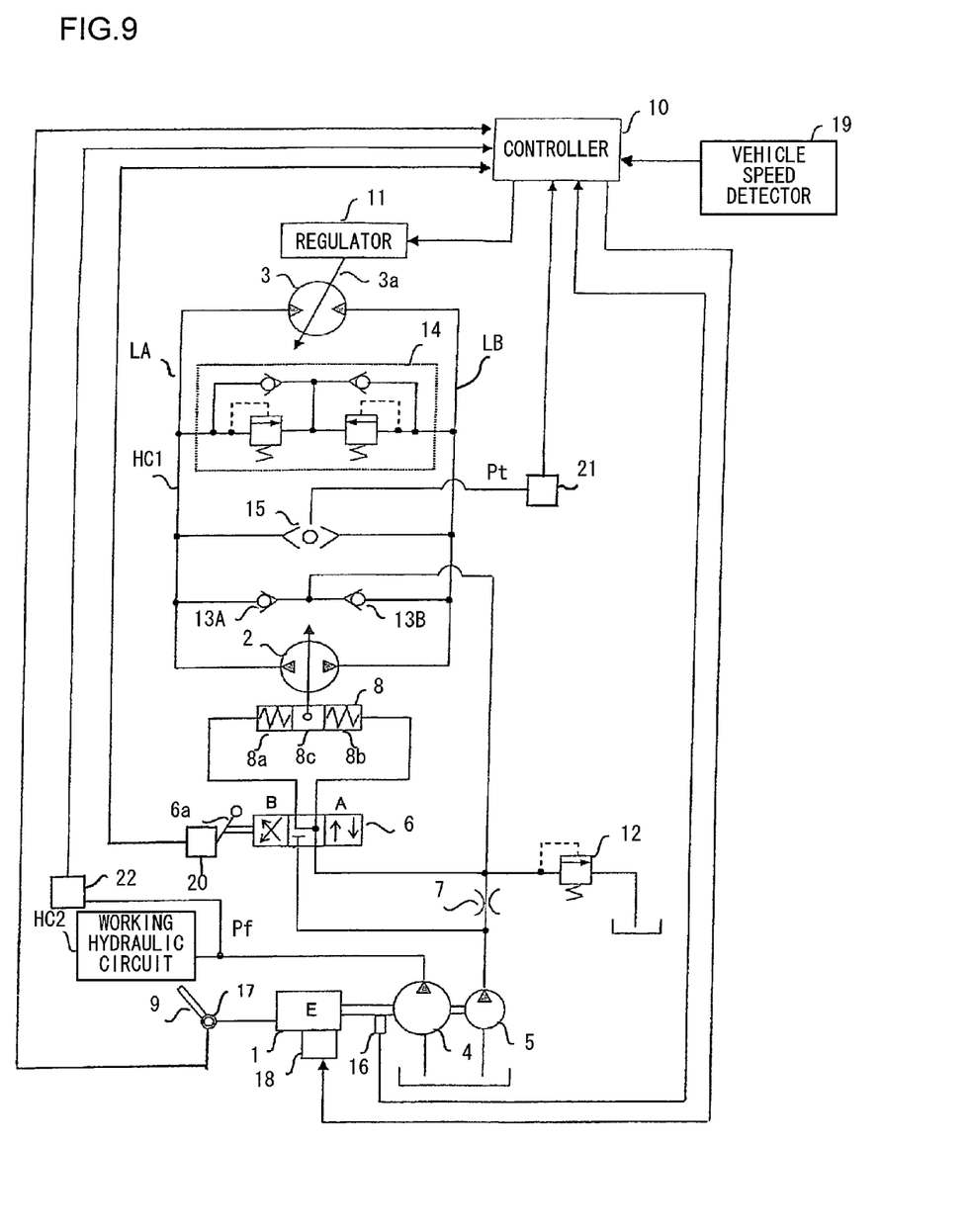
FIG. 9 A schematic structure of a control apparatus according to a second embodiment.
Figure 10:
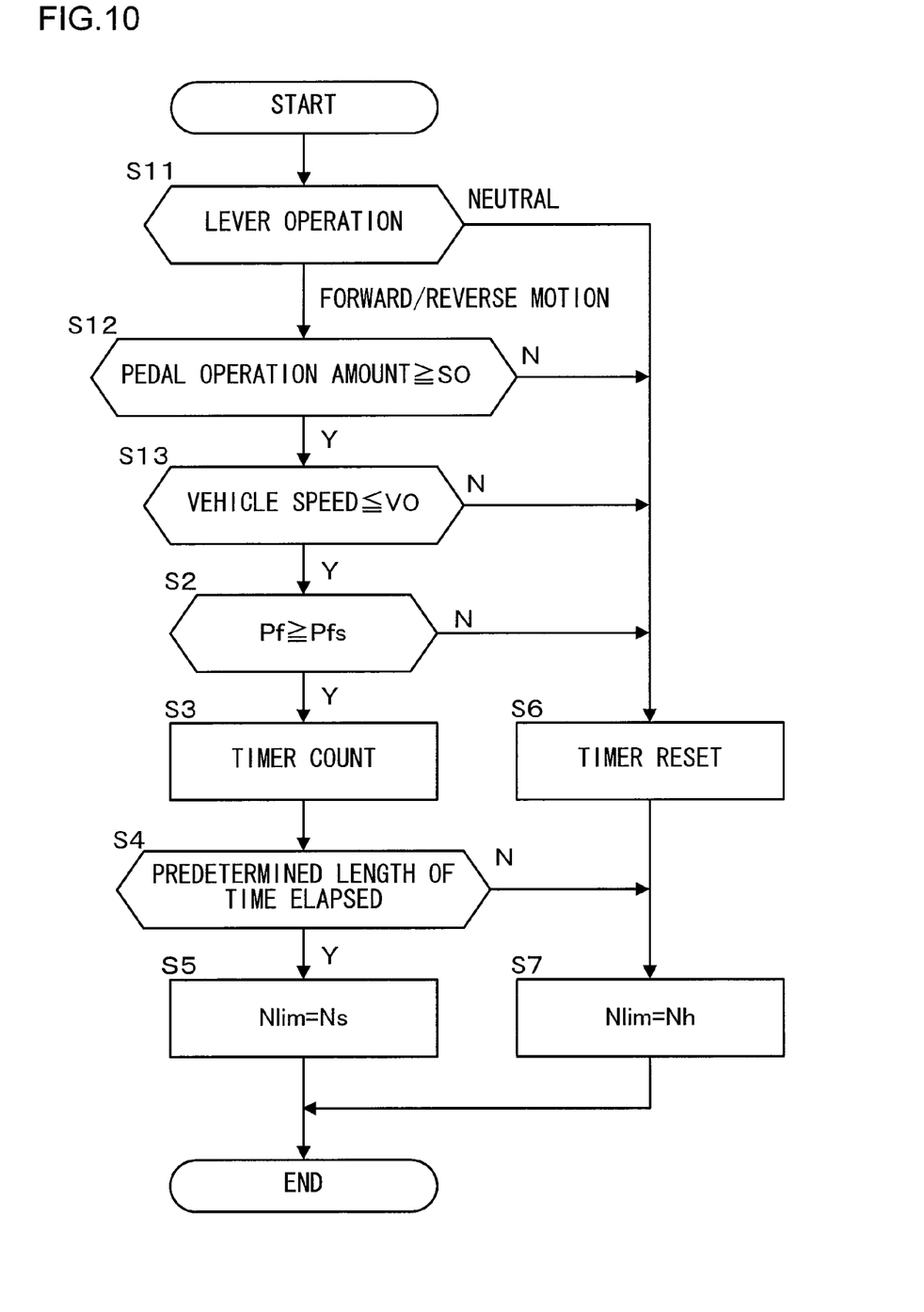
FIG. 10 A flowchart of an example of processing that may be executed by the speed upper limit setting unit according to the second embodiment.
Figure 11:
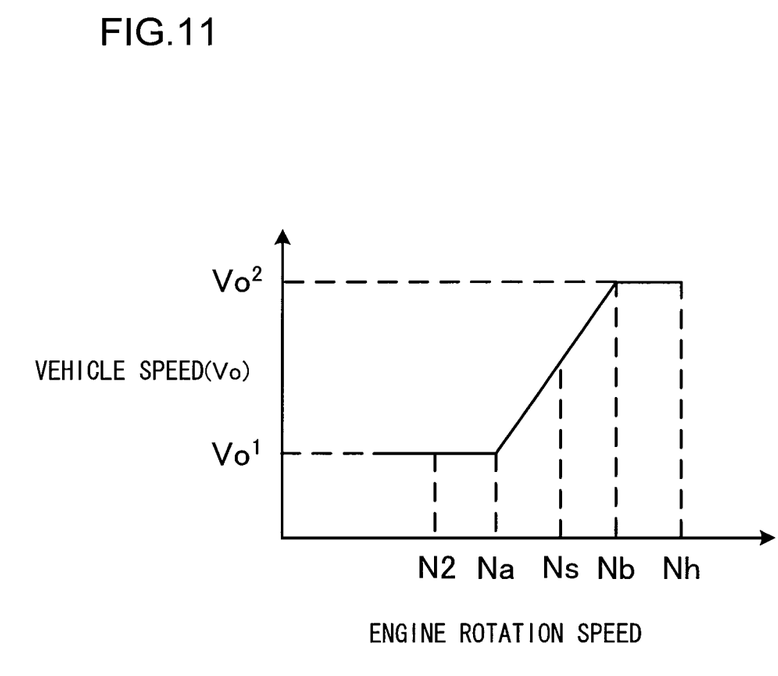
FIG. 11 A figure showing a variation of the second embodiment.

The second embodiment of the control apparatus for working vehicle according to the present invention is explained, given in reference to FIGS. 9~11.

The second embodiment differs from the first embodiment in the processing executed in the speed upper limit setting unit of the controller 10. Namely, while in the first embodiment the upper limit Nlim of the engine rotation speed is reduced to Ns on the condition that the travel circuit pressure Pt is equal to or greater than the predetermined value Pts and the working circuit pressure Pf is equal to or greater than the predetermined value Pfs, in the second embodiment the upper limit Nlim is reduced on the condition that the depression amount of the accelerator pedal 9 is equal to or greater than a predetermined value, the vehicle speed is equal to or less than a predetermined value, and the working circuit pressure Pf is equal to or greater than a predetermined value. The following explanation focuses on the difference from the first embodiment.

FIG. 9 is a schematic structure of the control apparatus according to the second embodiment. It is to be noted that the same reference numerals are assigned to components identical to those in FIG. 2. Signals are input to the controller 10 from each of the pressure sensors 21 and 22, the operation amount detector 17 and the tachometer 16. In addition, in the second embodiment, a signal from an operation detector 20 that detects operation of the operation lever 6a and a signal from a vehicle speed detector 19 that detects vehicle speed are input to the controller 10.

FIG. 10 is a flowchart of an example of processing that may be executed by the speed upper limit setting unit according to the second embodiment. It is to be noted that the same reference numerals are assigned to processes identical to those in FIG. 5. In a step S11, a decision is made as to operation of the operation lever 6a in accordance with a signal from the operation detector 20. If it is decided that the operation lever 6a has been operated to the forward position or reverse position, i.e., operated to the position that enables the vehicle to travel, the flow of processing proceeds to a step S12. On the other hand, if it is decided that the operation lever 6a has been operated to a neutral position, i.e., operated to the position that disables the vehicle to travel, the flow of processing proceeds to the step S6.

In the step S12, a decision is made as to whether or not the accelerator pedal 9 has been operated by equal to or greater than a predetermined value S0 in accordance with a signal from the operation amount detector 17. The predetermined value S0, that is a threshold value used for making a decision as to high load travel, is set to, for instance, approximately 80% of the full operation amount. Upon making an affirmative decision in the step S12, the flow of processing proceeds to a step S13. On the other hand, upon making a negative decision in the step S12, the flow of processing proceeds to the step S6. In the step S13, a decision is made as to whether or not the vehicle speed is less than or equal to a predetermined value V0 in accordance with a signal from the vehicle speed detector 19. The predetermined value V0, that is a threshold value used for making a decision as to high load travel, is set to, for instance, approximately 3 km/h. Namely, since a high load is applied to the vehicle in the event that the vehicle travels while performing an excavation work, the vehicle speed becomes equal to or less than 3 km/h even if the accelerator pedal 9 is depressed equal to or greater than 80%. The predetermined values S0 and V0 are determined in view of those points. Upon making an affirmative decision in the step S13, the flow of processing proceeds to the step S2. On the other hand, upon making a negative decision in the step S13, the flow of processing proceeds to the step S6.

In excavation work in FIG. 8, the operation amount of the accelerator pedal 9 becomes equal to or greater than the predetermined value S0, the vehicle speed becomes equal to or less than the predetermined value V0, and the working circuit pressure Pf becomes equal to or greater than a predetermined value. When this state continues for the predetermined length of time t0, the upper limit Nlim of the engine rotation speed decreases to Ns. This reduces the relief amount from the relief valve 14, thereby resulting in reduced heat energy loss. It is to be noted that when the operation lever 6a for traveling is in a neutral position, the upper limit Nlim of the engine rotation speed can be reduced automatically only in a travelable state.

It is to be noted that in the second embodiment the threshold value V0 of vehicle speed may be varied in correspondence to the engine rotation speed or the depression amount of the accelerator pedal 9. FIG. 11 is an example of the threshold value V0 varied in correspondence to the engine rotation speed. In FIG. 11, the threshold value V0 is equal to V01 (e.g., 1 km/h) when the engine rotation speed is equal to or less than the predetermined value Na, the threshold value V0 proportionally increases in the range where the engine rotation speed is equal to or greater than Na and equal to or less than Nb, and, the threshold value V0 becomes equal to V02 (e.g., 3 km/h) when the engine rotation speed is greater than Nb. Thus, by varying the threshold value V0 in correspondence to the engine rotation speed, an accurate decision can be made as to high load working state.

Although in the above embodiment the travel circuit HC1 is formed through a closed circuit connection of the hydraulic pump 2 and the hydraulic motor 3, and the working circuit HC2 is constituted by the hydraulic pump 4, the cylinders 114 and 115 that are driven by pressure oil from the hydraulic pump 4, the circuit structures of those travel circuit and working circuit are not limited to those described in reference to the embodiment. For example, the travel circuit HS1 is configured by combining one motor per one pump, however, the circuit may be configured by a plurality of motors.

The engine rotation speed may be instructed using an operation member other than an accelerator pedal. Although the engine rotation speed is controlled based on the predetermined characteristic in FIG. 3, the structure of the rotation speed control unit is not limited to that described above as long as the engine rotation speed is controlled in correspondence to the pedal operation amount. Although pressure oil from the travel circuit HC1 is relieved through the relief valve 14, high pressure oil from the circuit HC1 may be relieved through another relief device. In addition, the relief device may relieve high pressure oil of at least one of the travel circuit HC1 and the working circuit HC2.

In the first embodiment, when the state, in which the working circuit pressure Pf is equal to or greater than the predetermined value (working setting circuit pressure) Pfs and the travel circuit pressure Pt is equal to or greater than the predetermined value (travel setting circuit pressure) Pts, continues for the predetermined length of time t0, it is determined that the vehicle is in a state of high load travel and high load work. In the second embodiment, when the state, in which the vehicle speed is equal to or less than the predetermined value (set vehicle speed) V0, the pedal operation amount is equal to or greater than the predetermined value S0, and the working circuit pressure Pf is equal to or greater than the predetermined value (working setting circuit pressure) Pfs, continues for the predetermined length of time t0, it is determined that the vehicle is in a state of high load travel and high load work. However, these simply describe specific examples, and another structure may be adopted in the state detection unit that detects the vehicle state of high load travel and high load work.

As long as the upper limit Nlim of the engine rotation speed is reduced when at least the vehicle state of high load travel and high load work is detected, the processing by the controller 10 as a speed limitation unit may be other than that described above and may not be conditional on continuation of the predetermined length of time t0. Although the upper limit Nlim of the engine rotation speed is reduced to the predetermined value Ns, the predetermined value Ns may be variable. Although in the above embodiment, Ns (a first rotation speed) is set to higher than Na (a second rotation speed) (FIG. 6 (a)), Ns may be set to another value as long as the relationship is established in which the maximum travel load pressure Ptmax of the travel circuit is equal to the relief pressure Ptr defined by the relief valve 14.

Although the pressure sensor 21 detects the load pressure Pt in the travel circuit HC1 and the pressure sensor 22 detects the load pressure Pf in the working circuit HC2, any structure may be adopted in the travel circuit pressure detector and the working circuit pressure detector. Although the vehicle speed detector 19 detects the vehicle speed and the operation amount detector 17 detects the pedal operation amount, any structure may be adopted in the vehicle speed detector and the operation amount detector. Although a decision is made as to whether or not the vehicle is in a travelable state in accordance with a signal from the operation detector 20, the structure of the travel determination unit is not limited to that described above.

While an explanation is given above on an example in which the control apparatus of the present invention is adopted in a wheel loader, the present invention may also be adopted in other types of working vehicles. Namely, as long as the features and functions of the present invention are realized effectively, the present invention is not limited to the travel control apparatus achieved in the embodiments.

The disclosure of the following priority application is herein incorporated by reference:

Japanese Patent Application No. 2007-61955 (filed on Mar. 12, 2007)

The invention claimed is:

1. A control apparatus for working vehicle, comprising:
a travel circuit that is formed through a closed circuit connection of a variable displacement hydraulic pump driven by an engine and a variable displacement hydraulic motor;
a work circuit that comprises a work hydraulic pump that is driven by the engine and a work hydraulic actuator that operates by pressure oil from the work hydraulic pump;
a relief device that relieves high pressure oil of at least one of the travel circuit and the work circuit;

an operating member that instructs an engine rotation speed;
a rotation speed control unit that controls the engine rotation speed in correspondence to an operation amount of the operating member;
a state detection unit that detects a vehicle state of high load travel and high load work; and
a speed limitation unit that reduces an upper limit of engine rotation speed, which upper limit of engine rotation speed is controlled by the rotation speed control unit, when at least the vehicle state of high load travel and high load work is detected by the state detection unit, wherein:
the state detection unit comprises:
    a travel circuit pressure detector that detects a load pressure in the travel circuit;
    a work circuit pressure detector that detects a load pressure in the work circuit; and
    the state detection unit determines the vehicle state of high load travel and high load work at least when a travel circuit pressure detected by the travel circuit pressure detector is equal to or greater than a set travel circuit pressure and a work circuit pressure detected by the work circuit pressure detector is equal to or greater than a set work circuit pressure.

2. A control apparatus for working vehicle according to claim 1, wherein:
the speed limitation unit reduces the upper limit of the engine rotation speed when the vehicle state of high load travel and high load work continues to be detected by the state detection unit for a predetermined length of time.

3. A control apparatus for working vehicle according to claim 1, wherein:
the relief device is a relief valve that relieves high pressure oil in the travel motion circuit; and
when the vehicle state of high load travel and high load work is detected by the state detection unit, the speed limitation unit reduces the upper limit of the engine rotation speed to a first rotation speed at which a relationship that a maximum travel load pressure in the travel circuit corresponds to a relief pressure that is defined by the relief valve is established.

4. A control apparatus for working vehicle according to claim 3, wherein:
the maximum travel load pressure in the travel circuit becomes the relief pressure when the engine rotation speed is equal to or greater than a second rotation speed; and
the first rotation speed is set to a higher value than the second rotation speed.

5. A control apparatus for working vehicle comprising:
a travel circuit that is formed through a closed circuit connection of a variable displacement hydraulic pump driven by an engine and a variable displacement hydraulic motor;
a work circuit that comprises a work hydraulic pump that is driven by the engine and a work hydraulic actuator that operates by pressure oil from the work hydraulic pump;
a relief device that relieves high pressure oil of at least one of the travel circuit and the work circuit;
an operating member that instructs an engine rotation speed;
a rotation speed control unit that controls the engine rotation speed in correspondence to an operation amount of the operating member;
a state detection unit that detects a vehicle state of high load travel and high load work; and
a speed limitation unit that reduces an upper limit of engine rotation speed that is controlled by the rotation speed control unit when at least the vehicle state of high load travel and high load work is detected by the state detection unit,
wherein:
the state detection unit comprises:
    a vehicle speed detector that detects a vehicle speed;
    an operation amount detector that detects an operation amount of the operating member;
    a work circuit pressure detector that detects a load pressure in the working circuit; and
    the state detection unit determines the vehicle state of high load travel and high load work at least when a vehicle speed detected by the vehicle speed detector is equal to or less than a set vehicle speed, an operation amount detected by the operation amount detector is equal to or greater than a predetermined value, and a work circuit pressure detected by the work circuit pressure detector is equal to or greater than a set work circuit pressure.

6. A control apparatus for working vehicle according to claim 5, wherein:
the state detection unit further includes a travel decision unit that makes a decision as to whether or not a vehicle is in a travelable state in which the vehicle is allowed to travel forward and rearward; and
the state detection unit determines the vehicle state of high load travel and high load work when the travel decision unit determines that the vehicle is in a travelable state, a vehicle speed detected by the vehicle speed detector is equal to or less than a set vehicle speed, an operation amount detected by the operation amount detector is equal to or greater than a predetermined value, and a work circuit pressure detected by the work circuit pressure detector is equal to or greater than a set work circuit pressure.

7. A control apparatus for working vehicle according to claim 5, wherein:
the set vehicle speed is set to a greater value as the engine rotation speed increases.

* * * * *